Patented Jan. 26, 1954

2,667,485

UNITED STATES PATENT OFFICE 2,667,485

2,4-DIAMINO-6-(HYDROXYALKYL) PTERIDINES

Harold G. Petering, Kalamazoo, Mich., assignor to The Upjohn Company, Kalamazoo, Mich., a corporation of Michigan No Drawing. Application July 22, 1950, Serial No. 175,477

18 Claims. (Cl. 260—251.5)

This invention relates to 2,4-diamino-6 and 7-(hydroxyalkyl)-pteridines, [6 and 7 (hydroxyalkyl)-2,4 - diaminopyrimido - (4,5 - b) - pyrazines], more particularly to compounds represented by the formula:

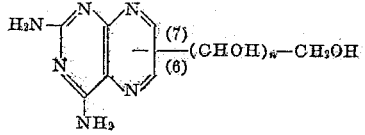

wherein $n$ is zero, 1, 2, or 3 and the hydroxyalkyl radical it attached to the 6 or 7 position of the pteridine nucleus, and to their preparation.

Illustrative members of the class of compounds of this invention have been prepared and found to be red to light tan crystalline or amorphous solids which are soluble in alkaline and acid solution, less soluble in water at pH 7.0 and insoluble in most common organic solvents. They char and decompose without definite melting when heated above 300 degrees centigrade. They are best characterized by their distincitve ultraviolet absorption spectra and the ratios of their extinction coefficients at the absorption maxima. The purity of the product (freedom from the isomeric compound) can be ascertained by the numerical value of the extinction coefficient $$E\frac{257\ mu}{370\ mu}$$

when measured in 0.1 normal alkali and the ratio $$E\frac{242\ mu}{335\ mu}$$

when measured in 0.1 normal acid. When the numerical value $$E\frac{257\ mu}{370\ mu}$$

is between about 2.9 and 3.2 the product is predominantly the 6-isomer with the value of 3.3 connoting analytically pure 6-isomer. When the numerical value of the $$E\frac{257\ mu}{370\ mu}$$

ratio is about 2.3–2.5 the product is predominantly the 7-isomer with the value 2.3 denoting pure 7-isomer. A numerical value of 1.5–1.6 for the $$E\frac{242\ mu}{335\ mu}$$

ratio denotes predominantly 6-isomer with the value of 1.6 indicating pure 6-isomer, while a numerical value of 0.90–1.00 indicates 7-isomer, with the value 0.90 denoting pure 7-isomer.

The products of this invention are useful as intermediates in the synthesis of folic acid antagonists and as antiviral agents and enzyme inhibitors.

The 6-isomers of this invention can be prepared by heating, in slightly acid solution, 2,4,5,6-tetraaminopyrimidine, hydrazine and a polyhydroxyaldehyde or polyhydroxyketone according to the equation:

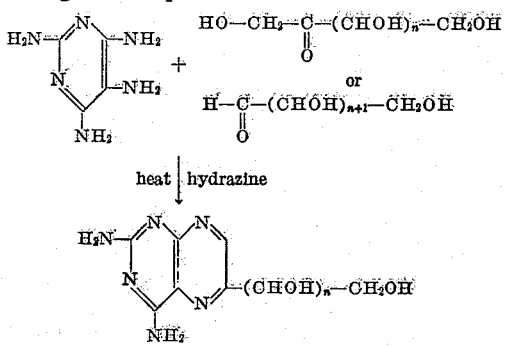

wherein $n$ has the values given. In the absence of hydrazine the reactions which take place largely follow other routes, so only a small quantity of the desired pteridine is formed, whose isolation from the other reaction products is extremely difficult. Since greatly improved yields and a higher purity of product result when hydrazine is present, a preferred method for the preparation of the 6-isomer involves the use of hydrazine as a reactant.

The 7-isomers can be prepared by heating together, in slightly acid solution 2,4,5,6-tetraaminopyrimidine and an osone (polyhydroxyketoaldehyde) according to the equation:

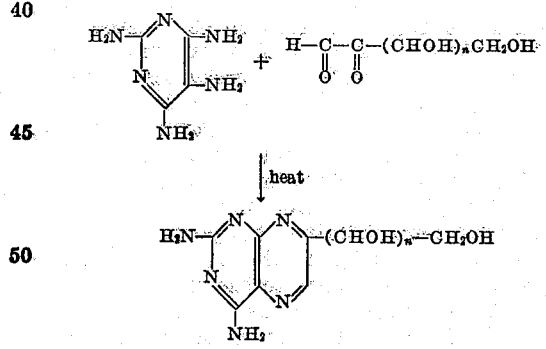

wherein $n$ has the values already given. In general the reaction conditions for the preparation of the 7-isomers parallel those for the preparation of the 6-isomers. In the preparation of 7-isomers it has been found that the presence of hydrazine does not increase the yield of product or its ease of isolation from the reaction mixture so that a preferred procedure for the preparation of 7-isomers does not involve the use of hydrazine as a reactant.

The required 2,4,5,6-tetraaminopyrimidine is not usually available as the free base but rather in the form of its acid addition salts which are much more stable during storage than the free base. Among the acid addition salts which have been found suitable for use are the salts of strong mineral acids such is the hydrochloride, sulfate, phosphate and the like with the sulfate being preferred. The free base is formed in the reaction mixture by the addition of an alkaline reagent to the reaction mixture, e. g. alkali metal hydroxides, carbonates, bicarbonates, acetates and the like with sodium acetate being a preferred reagent. After the pyrimidine has been converted to the free base, usually in the presence of the polyhydroxyaldehyde or polyhydroxyketone, the reaction mixture is acidified to between about pH 5.0 and about 6.5, any common acid being suitable for this purpose but acetic acid is preferred as a slight excess will not lower the pH of the solution as rapidly as when stronger acid is used. Further since the pH of the reaction mixture tends to change during the course of the reaction the presence of a buffering mixture, such as a sodium acetate-acetic acid mixture, is desirable as the pH can be easily maintained within the preferred range of pH 5.0 to pH 6.5 during the condensation with a minimum of difficulty. When 2,4,5,6-tetraaminopyrimidine salts are converted to the free base using an alkali metal acetate, an excess of the acetate can be used for its buffering effect. When a hydroxide or carbonate is used, the excess when neutralized with acetic acid provides sufficient alkali metal acetate so that it is not usually necessary to add more. When acids other than acetic are used to acidify the reaction mixture other known buffering mixtures can be used to keep the pH of the reaction mixture within the desired range.

The reaction mixture is usually heated to cause completion of the reaction within a reasonable period of time. This heating is preferably done at a temperature just below the boiling point of the reaction solution, with temperatures of between about 60 to about 100 degrees centigrade being satisfactory. The period of time required to complete the reaction and give optimum yields will vary and is in part dependent upon the size of the batch, the ratio of the various reactants and other factors which are readily apparent, with a time of up to about two hours having been found to be sufficient.

Both the 6 and 7-isomers can be isolated by simple cooling of the reaction mixture after completion of the reaction, whereby the desired product separates as a precipitate, collecting the product and after suitable washing to remove adhered solvent and other impurities drying the material. Further purification, when necessary, can be accomplished by solution in alkali or acid followed by reprecipitation by proper adjustment of the pH or other methods for the purification of pteridines known to the art.

A preferred method for the isolation of the 2,4-diaminopteridines of this invention involves their precipitation as their boric acid complex as is described and claimed in the copending application of John A. Schmitt, Serial No. 175,480, filed on even date herewith. According to this copending application the addition of boric acid to the reaction mixture forms a pteridine borate which is less soluble at pH 7.0 than is the 2,4-diaminopteridine base. There is obtained by this procedure, upon neutralizing and cooling the reaction mixture, a large quantity of the 2,4-diaminopteridine than can be obtained without the use of boric acid.

The following examples are illustrative of certain specific ways in which the process of this invention can be carried out and of certain of the products that are formed by this procedure, with minor variations in the method and the products obtained being readily apparent to those skilled in the art.

*Example 1.—2,4-diamino-6-tetrahydroxybutyl (D-arabo) pteridine*

To a dry intimate mixture of 1.065 grams of 2,4,5,6 - tetraaminopyrimidine - dihydrochloride, 0.85 gram of sodium bicarbonate and 1.98 grams of dextrose hydrate, thirteen milliliters of water was added, carbon dioxide being evolved very slowly. One milliliter of acetic acid and 0.6 milliliter of 85 percent hydrazine hydrate solution were added, and the reaction mixture placed on a steam bath. The pyrimidine dissolved slowly as the temperature rose, until at about 96 degrees centigrade solution was complete. To the resulting yellow solution, having a pH of about 7, acetic acid was added until the pH of the solution was reduced to about 5.0, whereupon the yellow solution darkened slowly, after about an hour becoming deep red. After heating the reaction mixture for a total of about two hours it was cooled to about plus five degrees centigrade. A dark brown gelatinous precipitate of 2,4 - diamino - 6 - tetrahydroxybutyl (D-arabo) pteridine separated which was collected, washed with alcohol and ether and after drying had a ratio $$E \frac{257 \text{ mu}}{370 \text{ mu}}$$

of 3.14, when determined in one-tenth normal sodium hydroxide solution. In 0.1 normal HCl maxima were found at 242 mu, 280 mu, and 335 mu with an $$E \frac{242 \text{ mu}}{335 \text{ mu}}$$

ratio of 1.5.

*Example 2.—2,4-diamino - 6 - tetrahydroxybutyl (D-arabo) pteridine and its di-boric acid complex*

A dry intimate mixture of 1.065 grams of 2,4,5,6-tetraaminopyrimidine hydrochloride, 0.85 gram sodium bicarbonate, 1.98 grams of dextrose hydrate and 0.6 grams of boric acid was prepared. Water, acetic acid and hydrazine hydrate were added and the condensation carried out as in Example 1. After cooling overnight the precipitate which had formed was collected, washed with alcohol, a mixture of ether and acetone, and dried at fifty degrees centigrade. There was thus obtained 0.5 gram of 2,4-diamino-6-tetrahydroxybutyl (D-arabo) pteridine boric acid complex as tan powder having an $$E \frac{257 \text{ mu}}{370 \text{ mu}}$$

ratio of 3.26.

When carried out in the same manner the condensation of 2,4,5,6-tetraaminopyrimidine with fructose gives the same pteridine.

*Example 3.—2,4-diamino-6-tetrahydroxybutyl (L-xylo) pteridine*

A dry mixture was prepared containing 1.065 grams of 2,4,5,6-tetraaminopyrimidine dihydrochloride; 0.35 gram of sodium bicarbonate and 1.8 grams of L-sorbose. To the dry mixture thirteen milliliters of water was added, followed by 1.0 milliliter of acetic acid and 0.6 milliliter of an 85 percent solution of hydrazine hydrate. The pH of the solution was adjusted from about 7.0 to about pH 5–6 by the addition of glacial acetic acid, one-half milliliter being sufficient. The reaction mixture was heated on a water bath to 95–100 degrees centigrade for about two hours and then cooled to about five degrees centigrade for sixteen hours. The brown precipitate which had formed was collected, washed with alcohol, acetone-ether and dried. There was thus obtained 0.67 gram of 2,4-diamino-6-tetrahydroxybutyl (L-xylo) pteridine as a brown powder which had an $$E\frac{257 \text{ mu}}{370 \text{ mu}} = 2.8$$

In a condensation carried out as above, the addition 0.60 gram of boric acid after completion of the heating period gave 1.51 grams of pteridine as the diboric acid complex which had an $$E\frac{257 \text{ mu}}{370 \text{ mu}}$$

ratio of 2.9.

When carried out in a like manner the condensation of L-xylose and 2,4,5,6-tetraaminopyrimidine gives 2,4 - diamino - 6 - trihydroxypropylpteridine.

*Example 4.—2,4-diamino-6-hydroxymethylpteridine*

To an intimate mixture of 1.2 grams of 2,4,5,6-tetraaminopyrimidine sulfate, 1.36 grams of sodium acetate tri-hydrate and 0.45 gram of dihydroxyacetone was added 0.6 gram of boric acid, a solution of 0.5 ml. glacial acetic acid and 0.3 ml. of 85 percent hydrazine hydrate solution dissolved in ten milliliters of water. The reaction mixture was warmed on a water bath to 40–60 degrees centigrade whereupon only a part of the boric acid failed to dissolve. The pH of the resulting solution was 4–5. After heating for about 45 minutes a brown precipitate appeared, whereupon the solution was cooled to about five degrees centigrade overnight and the resulting brown precipitate was collected, washed with fifty milliliters of alcohol, then acetone, ether and dried. About eighty milligrams of crude product was obtained.

To the alcoholic wash liquid, sodium hydroxide solution was added until the pH of the solution was about 7.0. A yellow precipitate of 2,4-diamino - 6 - hydroxymethylpteridine separated which was collected, washed successively with alcohol, acetone and ether and dried.

$$E\frac{257 \text{ mu}}{370 \text{ mu}} = 2.84$$

in N–10 sodium hydroxide solution.

*Example 5.—2,4-diamino-7-tetrahydroxybutyl (L-xylo) pteridine*

To a mixture of 800 milligrams of 2,4,5,6-tetraaminopyrimidine hydrosulfate and 600 milligrams of sodium bicarbonate, ten milliliters of water added and the mixture stirred vigorously. The pH of the solution was adjusted to a pH of 6.5 by the addition of sodium acetate and then added to 32 milliliters of a solution containing 650 milligrams of L-sorbosone (also called L-gulosone). One gram of boric acid was added and the solution was warmed on a steam bath until all of the reactants were in solution, after which the reaction mixture was heated to about 75 degrees centigrade for ten minutes. The reaction mixture was cooled and the resulting precipitate was collected and washed successively with 40 milliliters of water, ethanol and ether after which it was dried. There was thus obtained 690 milligrams of 2,4-diamino-7-tetrahydroxybutyl (L-xylo) pteridine as a tan powder whose ultraviolet absorption spectra in 0.1 normal NaOH solution showed minima at 235 mu and 310 mu and maxima at 255 mu and 365 mu, having an $$E\frac{255 \text{ mu}}{365 \text{ mu}}$$

ratio of 2.5. In 0.1 normal HCl maxima were observed at 240 mu, 285 mu and 335 mu and $$E\frac{240 \text{ mu}}{335 \text{ mu}} = 1.0$$

When carried out in a like manner the condensation of 2,4,5,6-tetraaminopyrimidine with glucosone gives 2,4-diamino-7-tetrahydroxybutyl (D-arabo) pteridine and with L-xylosone 2,4-diamino-7-trihydroxypropylpteridine is obtained.

I claim:

1. A member of the group consisting of compounds represented by the formula:

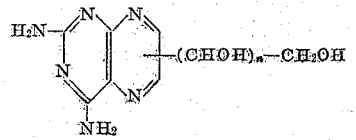

wherein *n* is a number selected from the group consisting of zero and the integers one to three inclusive.

2. 2,4-diamino-6-hydroxymethylpteridine.
3. A 2,4 - diamino - 6-tetrahydroxybutylpteridine.
4. A 2,4 - diamino- 7 -tetrahydroxybutylpteridine.
5. 2,4-diamino-6-tetrahydroxybutyl (D-arabo) pteridine.
6. 2,4-diamino-6 - tetrahydroxybutyl (L-xylo) pteridine.
7. 2,4-diamino-7 - tetrahydroxybutyl (L-xylo) pteridine.
8. A method for the preparation of 2,4-diaminopteridines having the formula:

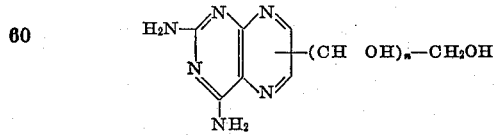

wherein *n* is a number selected from the group consisting of zero and the integers 1, 2 and 3 comprising contacting in slightly acid solution 2,4,5,6-tetraaminopyrimidine and a member of the group consisting of polyhydroxyaldehydes, polyhydroxyketones and osones and separating the pteridine thus formed from the reaction mixture.

9. A method for the preparation of a 2,4-diamino-6 - polyhydroxyalkylpteridine comprising contacting in slightly acid solution 2,4,5,6-tetraaminopyrimidine and a polyhydroxyaldehyde in the presence of hydrazine and isolating the 2,4-diamino-6-polyhydroxyalkylpteridine from the reaction mixture.

10. A method for the preparation of a 2,4-diamino-6 - polyhydroxyalkylpteridine comprising contacting in slightly acid solution 2,4,5,6-tetraaminopyrimidine and a polyhydroxyketone in the presence of hydrazine and isolating the 2,4-diamino-6-polyhydroxyalkylpteridine from the reaction mixture.

11. A method for the preparation of a 2,4-diamino-7 - polyhydroxyalkylpteridine comprising contacting in slightly acid solution 2,4,5,6-tetraaminopyrimidine and an osone and isolating the 2,4-diamino-7 - polyhydroxyalkylpteridine from the reaction mixture.

12. A method for the preparation of a 2,4-diamino-6 - tetrahydroxybutylpteridine comprising contacting in slightly acid solution a hexose, 2,4,5,6-tetraaminopyrimidine and hydrazine and isolating the 2,4-diamino-6-tetrahydroxybutylpteridine from the reaction mixture.

13. A method for the preparation of 2,4-diamino-6-tetrahydroxybutyl (D-arabo) pteridine comprising contacting in acid solution at a pH of between 5.0 and 6.5 and a temperature of between 25 degrees centigrade and 100 degrees centigrade, dextrose, 2,4,5,6-tetraaminopyrimidine and hydrazine and isolating the resulting 2,4-diamino-6-tetrahydroxybutyl (D-arabo) pteridine from the reaction mixture.

14. A method for the preparation of 2,4-diamino-6-tetrahydroxybutyl (D-arabo) pteridine comprising contacting in acid solution at a pH of between 5.0 and 6.5 and a temperature of between about 25 degrees centigrade and about 95 degrees centigrade glucose, 2,4,5,6-tetraaminopyrimidine and hydrazine and isolating the resulting 2,4-diamino-6-tetrahydroxybutyl (D-arabo) pteridine from the reaction mixture.

15. A method for the preparation of 2,4-diamino-6-tetrahydroxybutyl (L-xylo) pteridine comprising contacting in acid solution having a pH of between about 5.0 and about 6.5, sorbose, 2,4,5,6-tetraaminopyrimidine and hydrazine at a temperature between about 25 degrees centigrade and about 95 degrees centigrade and isolating 2,4-diamino-6-tetrahydroxybutyl (L-xylo) pteridine from the reaction mixture.

16. A method for the preparation of 2,4-diamino - 6 - hydroxymethylpteridine comprising contacting in acid solution having a pH of between 5.0 and 6.5, dihydroxyacetone, 2,4,5,6-tetraaminopyrimidine and hydrazine at a temperature between about forty degrees centigrade and about sixty degrees centigrade and isolating 2,4-diamino-6-hydroxymethylpteridine from the reaction mixture.

17. A method for the preparation of 2,4-diamino-7-tetrahydroxybutyl (L-xylo) pteridine comprising contacting in an acid solution having a pH of between about 5.0 and about 6.5, 2,4,5,6-tetraaminopyrimidine and sorbosone at a temperature between about forty and seventy-five degrees centigrade and isolating 2,4-diamino-7-tetrahydroxybutyl (L-xylo) pteridine from the reaction mixture.

18. A method for the preparation of 2,4-diamino-7-tetrahydroxybutyl (D-arabo) pteridine comprising contacting in an acid solution having a pH of between about 5.0 and about 6.5, 2,4,5,6-tetraaminopyrimidine and glucosone at a temperature between about forty and about seventy-five degrees centigrade and isolating the 2,4-diamino-7-tetrahydroxybutyl (D-arabo) pteridine from the reaction mixture.

HAROLD G. PETERING.

References Cited in the file of this patent

UNITED STATES PATENTS

| Number | Name | Date |
|---|---|---|
| 2,520,156 | Lindlar et al. | Aug. 29, 1950 |

OTHER REFERENCES

Skipper et al., Cancer 3, 348–353 (1950).
Karrer et al., Helv. Chim. Acta, 1031–1036 (1947).
Petering et al., J. Am. Chem. Soc. 69, 2566–2567 (1947).
Seeger et al., J. Am. Chem. Soc. 69, 2567 (1944).